(12) United States Patent
Arthurs

(10) Patent No.: US 6,344,250 B1
(45) Date of Patent: Feb. 5, 2002

(54) MULTILAYERED POLYOLEFIN HIGH SHRINKAGE, LOW SHRINK FORCE SHRINK FILM

(75) Inventor: Trevor Curtis Arthurs, Truro (CA)

(73) Assignee: Intertape Polymer Group, Nova Scotia (CA)

( * ) Notice: Subject to any disclaimer, the term of this patent is extended or adjusted under 35 U.S.C. 154(b) by 0 days.

(21) Appl. No.: 09/697,466

(22) Filed: Oct. 26, 2000

Related U.S. Application Data

(63) Continuation-in-part of application No. 09/095,361, filed on Jun. 10, 1998, now abandoned.

(51) Int. Cl.⁷ .................................................. B32B 27/08
(52) U.S. Cl. ...................... 428/34.9; 428/212; 428/516
(58) Field of Search ................................ 428/34.9, 212, 428/516

(56) References Cited

U.S. PATENT DOCUMENTS

| | | | |
|---|---|---|---|
| 4,229,241 A | 10/1980 | Mueller | 156/243 |
| 4,436,888 A | 3/1984 | Copple | 526/348.1 |
| 4,833,024 A | 5/1989 | Mueller | 428/349 |
| 4,865,902 A | 9/1989 | Golike et al. | 428/213 |
| 5,023,143 A | 6/1991 | Nelson | 428/516 |
| 5,272,016 A | * 12/1993 | Ralph | 428/516 |
| 5,306,549 A | * 4/1994 | Isozaki et al. | 428/220 |
| 5,707,751 A | * 1/1998 | Garza et al. | 428/515 |

OTHER PUBLICATIONS

Calvin J. Benning, "Plastic Films For Packaging Technology. Applications and Process Economics," 1983, pages 23 and 24, Technomic Publishing Company, Inc. No month.

* cited by examiner

Primary Examiner—Harold Pyon
Assistant Examiner—Sandra M. Nolan
(74) Attorney, Agent, or Firm—Roberts Abokhair & Mardula, LLC

(57) ABSTRACT

A polyolefin shrink film having high shrinkage and low shrink force. The film has a core layer formed from a polymer of ethylene with a melting point of greater than 100° C., outer layers of a homopolymer of ethylene or propylene or an ethylene/alpha-olefin copolymer. The film is not irradiated. The film may be used in the packaging of articles subject to breakage, distortion or deformation if packaged in shrink films with higher shrink force.

8 Claims, No Drawings

MULTILAYERED POLYOLEFIN HIGH SHRINKAGE, LOW SHRINK FORCE SHRINK FILM

RELATED APPLICATION

The application is a continuation-in-part application of U.S. patent application Ser. No. 09/095,361, filed Jun. 10, 1998, and now abandoned.

FIELD OF THE INVENTION

The present invention relates to heat shrinkable, thermoplastic packaging films and to packaging materials comprising such films. In particular, the present invention relates to multi-layered polyolefin shrink films that have high shrinkage and low shrink force characteristics.

BACKGROUND OF THE INVENTION

The bulk of commercially available shrink films are made from composition of either polyolefins or polyvinyl chloride (PVC). Such shrink films may be mono-layer films or multi-layer films. For polyolefins, the films include both cross-linked and uncross-linked oriented polyethylene, polypropylene, and ethylene/propylene copolymer films.

A shrink film's distinguishing characteristic is its ability to shrink when subjected to heat, or if restrained, to create shrink tension within the film. This ability is activated during a packaging process by passing the wrapped product through a hot air or hot water shrink tunnel. This causes the film to shrink around the product, producing a tight, transparent wrapping that conforms to the contour of the product and which is aesthetically pleasing while providing the useful functions required of packaging materials e.g. protection of the product from loss, pilferage or damage for any reason. A wide variety of products are packaged in shrink films.

The ability of a film to shrink upon exposure to some level of heat arises from the orientation of that film during manufacture. Substantially unoriented films are usually heated to their orientation temperature range, which is usually above room temperature but below the polymer's melting temperature. The film is then stretched, usually in both the cross (transverse) direction and the longitudinal (machine) direction to effect orientation of the film. After being stretched, but before release of the tension within the film causing the orientation, the film is rapidly cooled, thus freezing the polymer molecules of the film in their oriented state. Upon re-heating of the film during the packaging operation, the orientation stresses are relaxed and the film will begin to shrink back to its original, unoriented dimensions.

Some products may be subject to breakage and/or distortion and/or deformation at the shrink forces applied on shrinkage of the film. For this reason, shrink films that are characterized by a high degree of shrinkage but at a low shrink force have been developed. Such films use low melting point polymers to achieve the low shrink force, and generally must be cross-linked to give a shrink film with acceptable physical properties.

U.S. Pat. No. 5 272 016 of Ralph is directed to a biaxially oriented heat-shrinkable multi-layer stretch film having outer layers formed from a blend of about 20–35% of an ethylene alpha-olefin plastomer copolymer with a density below 0.90 g/cm$^3$ and 65–80% by weight of very low density polyethylene (VLDPE) of a density of 0.912–0.914 g/cm$^3$, and a core layer comprising an ethylene alpha-olefin copolymer with a higher melting point than the outer layers.

SUMMARY OF THE INVENTION

A polyethylene shrink film has now been developed which provides a combination of a low shrink force and good physical properties without requiring cross-linking of the film after orientation.

Accordingly, an aspect of the present invention provides a multi-layer shrink film with low shrink force, comprising outer layers formed from a polymer selected from the group consisting of propylene homopolymers, propylene copolymers and ethylene/alpha-olefin copolymers having a density of greater than 0.916 g/cm$^3$, and blends thereof, and a core layer, said core layer being interposed being said outer layers and being at least 50% by weight of the shrink film;

said core layer being formed from a blend of 40–100% by weight of linear low density polyethylene having a density of less than 0.90 g/cm$^3$, a melting point of greater than 1000° C. and a crystallinity of less than 30%, and 0–60% by weight of a material selected from the group consisting of propylene homopolymers, propylene copolymers, and blends thereof, the melting point of the linear low density polyethylene of the core layer being less than or equal to the melting point of the outer layer;

said film having a shrink force of less than 70 g/inch (178 g/cm) at a thickness of 60 mil (15.2 microns) at 110° C. when measured by the procedure of ASTM D2838.

Another aspect of the invention provides an article packaged in a multi-layer shrink film with low shrink force, said film comprising outer layers formed from a polymer selected from the group consisting of propylene homopolymers, propylene copolymers and ethylene/alpha-olefin copolymers having a density of greater than 0.916 g/cm$^3$, and blends thereof, and a core layer, said core layer being interposed being said outer layers and being at least 50% by weight of the shrink film;

said core layer being formed from a blend of 40–100% by weight of linear low density polyethylene having a density of less than 0.90 g/cm$^3$, a melting point of greater than 100° C. and a crystallinity of less than 30%, and 0–60% by weight of a material selected from the group consisting of propylene homopolymers, propylene copolymers, and blends thereof, the melting point of the linear low density polyethylene of the core layer being less than or equal to the melting point of the outer layer;

said film having a shrink force of less than 70 g/inch (178 g/cm) at a thickness of 60 mil (15.2 microns) at 110° C. when measured by the procedure of ASTM D2838.

DETAILED DESCRIPTION OF THE INVENTION

The present invention relates to shrinkable films that have low shrink force. Such films are multi-layer films, with a core layer interposed between opposed surface (skin) layers. The core layer may be a single layer or it may itself be a multiple layer. The typical heat shrinkable film of the present invention is at least 3 layers, with 3 layers being preferred, but may have 5 or more layers.

The core layer is formed from a blend of 40–100% by weight of a first polymer and 0–60% by weight of a second polymer. The first polymer is a linear low density polyethylene having a density of less than 0.90 g/cm$^3$, and especially less than 0.89 g/cm$^3$. The linear low density polyethylene has a melting point of greater than 100° C. In addition, the linear low density polyethylene has a crystallinity of less than 30% and especially less than 20%. The first polymer is a copolymer of ethylene with at least one higher alpha-olefin co-monomer and preferably would have a melt index suitable for the manufacture of film from such a polymer. An example of the linear low density polyethylene used in the core layer is a polyethylene available from Union Carbide under the designation 1085. This polymer is understood to be a very broad, low crystallinity polymer which generally has the characteristics of a linear low density polyethylene.

In the present invention, the linear low density polyethylene has a melting point of greater than 100° C. and especially greater than 110° C. In addition, the melting point of the linear low density polyethylene of the core layer is less than or equal to the melting point of the outer layer.

The second polymer of the core layer is a homopolymer or copolymer of propylene, especially ethylene/propylene copolymer, or a blend thereof. Such polymer is preferably a polymer capable of being extruded in the form of film.

The core layer is at least 50% by weight of the film, and in embodiments at least 60% by weight of the film.

The outer layers of the shrink film are formed from a homopolymer or copolymer of propylene, and ethylene/alpha-olefin copolymers having a density of greater than 0.916 g/cm$^3$. Examples of such films include Dowlex™ 2056AC polyethylene resin, with a melt index of 0.9–1.1 and a density of 0.9185–0.9215 g/cm$^3$, from Dow Chemical Canada Inc., and SCLAIR™ D122–23 ethylene/octene copolymer, with a melt index of 0.75 dg/min and a density of 0.919 g/cm$^3$, from NOVA Chemicals.

Heat shrinkable packaging films of the invention typically have a thickness of less than 2 mil, preferably less than 1.5 mil and especially less than 1.0 mil. The shrink films exemplified hereinafter have a thickness of 0.6 mil.

Heat shrinkable packaging films are manufactured using a coextrusion process in which the surface layers are coextruded with the core layer. In a coextrusion process, the layers of polymer are extruded through an annular coextrusion die, forming a tube (bubble) of the coextruded molten film. The tube is cooled and reheated to a temperature above the orientation temperature of the polymer, but below its melting point, prior to being extended. Using combinations of speed of withdrawal of the film from the extrusion die and the size of the bubble, the film is biaxially oriented. The biaxially oriented film that is obtained is then cooled and wound into rolls, although it could be fed directly to a subsequent stage, e.g. a slitting operation. Coextrusion techniques for manufactured of shrink films are known to persons skilled in the art.

It is to be understood that the heat shrinkable films of the invention may be subjected to a number of processing steps after manufacture, including perforation and treatment with a corona discharge. However, it is not necessary to irradiate the film in order to obtain a commercially-acceptable shrink film.

It is believed that it is now possible to produce a multi-layer shrink film that meets the requirements for a shrink film with low shrink force, especially both high shrinkage and low shrink force. In particular, the film has a shrink force of less than 70 g/inch, and in embodiments less than 50 g/inch, at a film thickness of 0.60 mil at 110° C., when measured by the procedure of ASTM D2838.

The film of the present invention may be used for packaging a variety of products, especially products that tend to be susceptible to breakage, distortion or deformation in a shrink wrap packaging process. In particular, the film may be usable to package products that cannot be packaged with shrink films exhibiting higher shrink forces. Examples may include stationery, calendars, software and apparel.

An advantage of the film of the present invention is that the properties of the film may be obtained without the need to cross-link the film during the process of manufacture. Thus, the economics of the process of manufacture are improved, as irradiation equipment is not required. In addition, the film obtained is capable of being recycled, as it is not a cross-linked film.

The present invention is illustrated by the following examples:

EXAMPLE I

A three layer biaxially oriented tubular film was prepared by the general process described on page 23 and 24 of Chapter 3 of Plastic Films for Packaging, by Calvin J. Benning, published in 1983 by the Technomic Publishing Company, which is incorporated herein by reference to the same extent as if fully set forth therein. Such a co-extrusion and orientation process is also described above.

The three layer film of this example was characterized by a core of a blend 75% by weight of Union Carbide 1085 polyethylene (density of 0.884 g/cm$^3$, melting point 117° C.) and 25% by weight of an ethylene/propylene copolymer available from Fina under the trade designation 6253 (density of 0.900 g/cm$^3$, melting point 147° C). The outer layers of the film were formed from a linear low density polyethylene available from NOVA Chemicals under the designation D122–23, with a density of 0.919 g/cm$^3$ and a melting point 121° C.). Such polymer is an ethylene/octene copolymer.

These polymers were coextruded to form a three layer tube which was quenched, reheated and simultaneously pneumatically blown and stretched in the machine direction to create a biaxially oriented multi-layer heat shrinkable film. The resultant film is a film of the present invention.

The properties of the film of the invention were compared with the properties of a film available from Cryovac under the designation D940, which is understood to be a cross-linked low shrink force film. Both films had a thickness of 0.6 mil.

The results obtained are given in Table 1.

TABLE I

| Test | Procedure* | Invention | "D940" |
|---|---|---|---|
| Haze (%) | D1003 | 3.1 | 3.6 |
| Gloss(%) | D2457 | 151 | 147 |
| MD Tensile (lb) | D882 | 14,000 | 11,000 |
| TD Tensile (lb) | D882 | 13,000 | 10,000 |
| MD Modulus (psi) | D882 | 28,000 | 25,000 |
| TD Modulus (psi) | D882 | 28,000 | 21,000 |
| MD Elongation (%) | D882 | 151 | 100 |
| TD Elongation (%) | D882 | 136 | 118 |
| MD Tear (g) | D1922 | 10 | 15 |
| TD Tear (g) | D1922 | 14.4 | 18 |
| MD Shrinkage @ 250° F. (%) | D2732 | 59 | 70 |
| TD Shrinkage @ 250° F. (%) | D2732 | 67 | 75 |

*ASTM procedure
The film of the invention is believed to be an acceptable shrink film.

EXAMPLE II

The shrink force was determined at a number of temperatures for films having a thickness of 0.6 mil, using the procedure of ASTM D2838. The shrink force was measured for the two films of Example I, as well as for a standard multi-layer shrink film manufactured by Intertape and sold under the designation IP42.

The shrink force results, measured in g/inch at 110° C., obtained for the films are shown in Table II.

TABLE II

| Temperature (° F.) | "IP42" | Invention | "D940" |
| --- | --- | --- | --- |
| Transverse Direction (TD) | | | |
| 140 | 30 | 31 | 31 |
| 160 | 51 | 44 | 44 |
| 175 | | 56 | 56 |
| 195 | 78 | 59 | 59 |
| 210 | | 60 | 60 |
| 230 | 94 | 60 | 60 |
| Machine Direction (MD) | | | |
| 140 | 38 | 27 | 27 |
| 160 | 49 | 35 | 35 |
| 175 | | 44 | 44 |
| 195 | 61 | 48 | 48 |
| 210 | | 49 | 49 |
| 230 | 86 | 56 | 52 |

The film of the invention and the comparative film "D940" have essentially identical shrink force properties. However, it is understood that "D940" film is a cross-linked film, whereas the film of the invention is not. It is therefore believed that the film of the invention offers economic advantages, as well as being capable of being re-cycled so that the polymer may subsequently be subjected to other uses.

What is claimed is:

1. A multi-layer shrink film with low shrink force, comprising outer layers formed from a polymer selected from the group consisting of propylene homopolymers, propylene copolymers and ethylene/alpha-olefin copolymers having a density of greater than 0.916 g/cm$^3$, and blends thereof, and a core layer, said core layer being interposed being said outer layers and being at least 50% by weight of the shrink film;

said core layer being formed from a blend of 40–100% by weight of linear low density polyethylene having a density of less than 0.90 g/cm$^3$, a melting point of greater than 100° C. and a crystallinity of less than 30%, and 0–60% by weight of a material selected from the group consisting of propylene homopolymers, propylene copolymers, and blends thereof, the melting point of the linear low density polyethylene of the core layer being less than or equal to the melting point of the outer layers;

said film having a shrink force of less than 70 g/inch (178 g/cm) at a thickness of 60 mil (15.2 microns) at 110° C.

2. The shrink film of claim 1 in which the shrink force is less than 50 g/inch.

3. The multi-layer shrink film of claim 2 in which the core layer is 100% by weight of said linear low density polyethylene.

4. The multi-layer shrink film of claim 2 in which the core layer is a blend of said linear low density polyethylene and a propylene homopolymer or copolymer.

5. The multi-layer shrink film of claim 2 in which the blend of the core layer has a melting point of at least 110° C.

6. The multi-layer shrink film of claim 5 in which said melting point is greater than 115° C.

7. The multi-layer shrink film of claim 1 in which the core layer is at least 60% by weight of the shrink film.

8. An article packaged in a multi-layer shrink film with low shrink force, said film comprising outer layers formed from a polymer selected from the group consisting of propylene homopolymers, propylene copolymers and ethylene/alpha-olefin copolymers having a density of greater than 0.916 g/cm$^3$, and blends thereof, and a core layer, said core layer being interposed being said outer layers and being at least 50% by weight of the shrink film;

said core layer being formed from a blend of 40–100% by weight of linear low density polyethylene having a density of less than 0.90 g/cm$^3$, a melting point of greater than 100° C. and a crystallinity of less than 30%, and 0–60% by weight of a material selected from the group consisting of propylene homopolymers, propylene copolymers, and blends thereof; the melting point of the linear low density polyethylene of the core layer being less than or equal to the melting point of the outer layers;

said film having a shrink force of less than 70 g/inch (178 g/cm) at a thickness of 60 mil (15.2 microns) at 110° C.

* * * * *